(No Model.)

H. L. EARLE, H. F. SNEDIGAR & J. A. PEMENT.
STEAM BOILER.

No. 369,697. Patented Sept. 13, 1887.

WITNESSES
Emma F. Elmore
G. H. Warren

INVENTOR
Harry L. Earle
Henry F. Snedigar
Joseph A. Pement
by Jas. F. Williamson
ATTORNEY

UNITED STATES PATENT OFFICE.

HARRY L. EARLE, OF MINNEAPOLIS, MINNESOTA, AND HENRY F. SNEDIGAR AND JOSEPH A. PEMENT, OF IROQUOIS, DAKOTA TERRITORY; SAID PEMENT ASSIGNOR TO SAID EARLE AND SNEDIGAR.

STEAM-BOILER.

SPECIFICATION forming part of Letters Patent No. 369,697, dated September 13, 1887.

Application filed December 6, 1886. Serial No. 220,772. (No model.)

*To all whom it may concern:*

Be it known that we, HARRY L. EARLE, a resident of Minneapolis, county of Hennepin, State of Minnesota, and HENRY F. SNEDIGAR and JOSEPH A. PEMENT, both residents of Iroquois, county of Kingsbury, Territory of Dakota, all being citizens of the United States, have invented certain new and useful Improvements in Steam-Boilers, of which the following is a specification.

Our invention relates more particularly to the class of steam-boilers known as "return-flue" boilers.

In boilers of this class the flame-plate in the smoke-chamber is exposed to intense heat and is without any provision for keeping it cool. The result is that it speedily burns out and a new plate has to be substituted. Moreover, the smoke-chamber is the hottest part of the boiler, and most of that heat is wasted, as it is not brought into contact with the water. Another notable defect in ordinary boilers is that no means are provided for cleansing the water before taking it into the boiler. All the foreign matter held in solution by the water or freely floating therein goes into the boiler with the water. The result is that the boiler soon becomes incrusted with precipitates and its efficiency is lost.

The object of our invention is to overcome all these defects by providing a flame-plate which cannot burn out, utilizing the heat of the smoke-arch to heat the feed-water, and cleansing the water of all foreign matter before it enters the boiler. We accomplish these results by means simple, economical, and efficient, as shown in the accompanying drawings, and hereinafter fully described and claimed.

Figure 1:
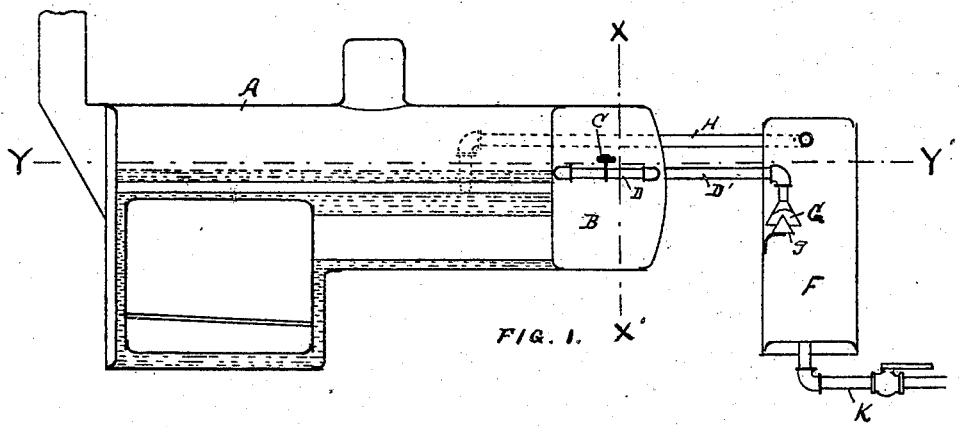
Figure 2:
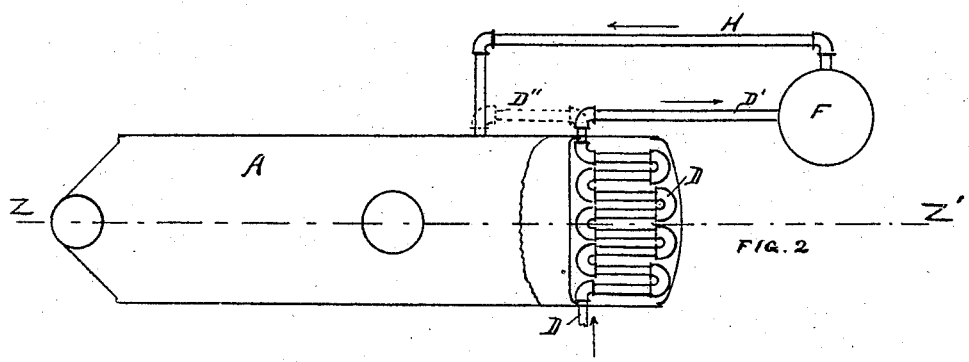
Figure 3:
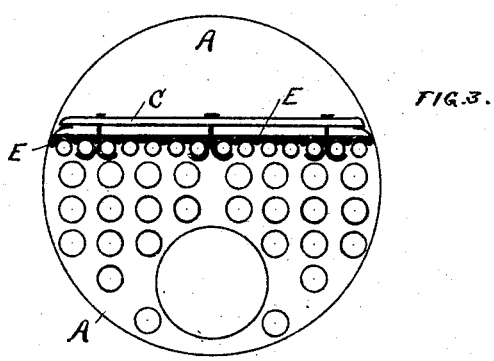

In the drawings, like letters referring to like parts throughout, Figure 1 is a longitudinal section on the line Z Z' of Fig. 2. Fig. 2 is a plan view, partly in section, on the line Y Y' of Fig. 1. Fig. 3 is a cross-section on the line X X' of Fig. 1.

A is the body of an ordinary return-flue boiler. B is the rear arch or smoke chamber in the same.

C is a supporting-bar resting on brackets riveted to the sides of the boiler.

D is the flame-plate or smoke-chamber division, composed of the feed-water pipe bent upon itself into the form of a zigzag coil, and is attached by hooks, staples, or in any suitable way to the supporting-bar C.

E is a layer of some non-combustible material—like fire-clay or asbestus—which is placed over the top of the coil. I use fire-clay and plaster it over the coil.

F is a sediment-trap, placed at some convenient point intermediate the feed-water heater and the boiler.

D' is an extension of feed-pipe leading from the coil to the trap.

G g is a deflecting-nozzle attached to D' within the trap F. It is composed of the truncated cone G and the smaller cone, g, held within the same in any suitable way, as by the brackets shown, whereby the water from D' enters the trap F in the form of a spray and does not stir up the sediment. This nozzle is located at some point within the trap above the bottom, preferably about the center of the same.

H is the outlet feed-water pipe leading from the top or near the top of trap F to the water-boiler.

K is a blow-off pipe provided with a stop-cock attached to the bottom of trap F.

The return or horizontal portions of the zigzag coil are brought as close together as possible by making the bends of the pipe sharp. The fire-clay or other non-combustible material is placed over the top, forming a continuous layer, and thereby preventing the flames from passing up through the spaces between the return portions of the coil.

The operation is as follows: The water is forced into the feed-water pipe D by the pumps (not shown) and the pressure is equal throughout D, D', F, and H. In passing through the coil in the smoke-chamber the water is heated to about or above the boiling-point and enters the trap F at such a degree of temperature that the foreign substances held in solution will be precipitated. As the water enters the trap F through the water-deflector G, the body of water at the bottom will remain comparatively quiet and the sediment will not be stirred up; hence the water will pass out of the trap through pipe H to the boiler clean and free from foreign substances.

Whenever the trap gets so full of sediment as to interfere with the further successful working of the same, it may be cleaned out through the blow-off K.

The feed-water-pipe coil with its fire-clay top thus itself serves as the flame-plate of the smoke-chamber, and as the coil is always filled with water it is in no danger of burning out. At the same time the highest use is made of the heat in the smoke-chamber, the feed-water is raised to such a temperature that the foreign matter will be precipitated and may be caught in the trap, and the water enters the boiler clean and hot.

In alkaline-water districts, like Dakota, the removal of foreign matter is of especially great importance. In some localities, however, where the water is so pure as not to require cleansing, the sediment-trap may be dispensed with. In that event we simply connect the feed-water flame-plate directly to the boiler, as shown in dotted lines in Fig. 2; or it may be desirable to have it so that the feed-water may be turned through the trap or directly into the boiler at will.

We have described our invention as applied to return-flue boilers, and this is its primary purpose; but it will be understood that it may have other applications.

What we claim, and desire to secure by Letters Patent of the United States, is as follows:

1. In return-flue boilers, in combination, feed-pipe flame-plate D, non-combustible cover E, and supporting-bar C, substantially as described.

2. In combination, return-flue boiler A, feed-water-pipe flame-plate D, coil-cover E, composed of fire-clay or other non-combustible material, feed-pipe extension D', provided with deflecting-nozzle G g, sediment-trap F, and outlet-pipe H, substantially as described.

HARRY L. EARLE.
HENRY F. SNEDIGAR.
JOSEPH A. PEMENT.

In presence of—
JAS. F. WILLIAMSON,
EMMA F. ELMORE,
WM. WELTON,
HUBERT B. WOLFF.